United States Patent

Brown et al.

[11] 3,752,314
[45] Aug. 14, 1973

[54] FLUME WATER RECYCLING APPARATUS

[75] Inventors: James A. Brown, Birmingham; Eddie G. Chieves, Leeds; Wesley D. Runyan, Pinson, all of Ala.

[73] Assignee: The Rust Engineering Company, Pittsubrgh, Pa.

[22] Filed: Aug. 27, 1971

[21] Appl. No.: 175,516

[52] U.S. Cl.................... 209/173, 61/14, 210/167, 210/525
[51] Int. Cl............................................. B03d 1/00
[58] Field of Search.......................... 302/14, 15, 16; 61/14, 30; 209/173, 13, 17, 18, 2; 210/162, 167, 525, 532

[56] References Cited
UNITED STATES PATENTS
3,367,495   2/1968   Lea et al.......................... 209/173 X Primary Examiner—Evon C. Blunk
Assistant Examiner—H. S. Lane
Attorney—David S. Urey

[57] ABSTRACT

Flume water recycling apparatus operates in conjunction with a flume and a jackladder of a log handling system. Flume water with logs, loose bark, grit and sand flows down the flume toward the jackladder. The sand and some grit pass through a sand outlet into a collection pit beneath the end of the flume, whereas the logs, water, remaining grit and bark flow over a bridge toward the jackladder. Logs and large pieces of bark are removed from the water by a series of flights of the jackladder. Water, grit and small pieces of bark flow through tapered apertures provided in a tail section of the jackladder and into a grit settling trough. Slow water velocity in the trough promotes settling of the grit to the bottom of the trough. The return run of the flights extends along the bottom and scrapes the grit into the collection pit. The flights then extend around a tail pulley for advancement into a flight guide tunnel formed by the bridge and the tail section to prevent jamming of the flights. Bark and relatively clear water flow from the trough into side channels that extend to a second grit settling trough. Water and bark from the second trough flow into a bark basin where the bark is separated from the water and the water is returned to the flume.

12 Claims, 11 Drawing Figures

Patented Aug. 14, 1973

INVENTORS.
JAMES A. BROWN
EDDIE G. CHIEVES
WESLEY D. RUNYAN

BY David Silvey
ATTORNEY

Patented Aug. 14, 1973

INVENTORS,
JAMES A. BROWN
EDDIE G. CHIEVES
WESLEY D. RUNYAN

BY David Ulrey
ATTORNEY

FIG. 6

Patented Aug. 14, 1973

INVENTORS.
JAMES A. BROWN
EDDIE G. CHIEVES
WESLEY D. RUNYAN

BY David Illuy
ATTORNEY

Patented Aug. 14, 1973

INVENTORS.
JAMES A. BROWN
EDDIE G. CHIEVES
WESLEY D. RUNYAN

BY David Ellrey
ATTORNEY 3,752,314

FLUME WATER RECYCLING APPARATUS

BACKGROUND OF THE INVENTION

1. Field of the Invention

The present invention relates to a system for recycling flume water. More particularly, it relates to a combination of apparatus for removing sand, grit, and bark from water used to convey logs to a jackladder in a woodyard of a pulp and paper mill.

In the past, it has been difficult to satisfactorily operate the bark and grit system of a pulp and paper mill woodyard. As an example, prior woodyard equipment for removing bark and grit from flume water has been noted for exceptionally high maintenance, poor performance, numerous breakdowns, and rising initial installation costs. In particular, studies of such equipment in the field indicate, among other things, that the equipment has a low overall efficiency of bark and grit collection and that grit-collector buckets fail to completely discharge the grit.

2. Description of the Prior Art

The prior grit and bark removal apparatus have been characterized by the use of numerous major components having many moving parts and motors. For example, one such apparatus includes two grit drag chain conveyors and their drives, one grit dewatering chain conveyor and drive, two travelling bark screens and their drives, one bark dewatering chain conveyor and drive, and one bark transfer belt conveyor and drive. The maintenance problems and high installation costs are directly related to the use of such major components.

SUMMARY OF THE INVENTION

Research that has been conducted in an endeavor to provide a flume water recycling apparatus that is not limited by the deficiencies of the prior apparatus. Such research indicates that by minimizing the number of major components having moving parts and by using a novel combination of other equipment of a log handling system, the flume water recycling apparatus will operate with fewer maintenance problems and require less original investment.

The flume water recycling apparatus includes a sand outlet at the discharge end of the flume. Sand and grit pass through the outlet into a grit collecting pit. The tail section of the jackladder is mounted above the pit and beneath the bridge that extends from the discharge end of the flume to the jackladder. The top of the bridge directs logs and large pieces of bark onto the jackladder, whereas an underside of the bridge and the tail section cooperate to form a flight guide tunnel. A grit settling trough extending under the jackladder receives grit, small pieces of bark and water that flow through tapered apertures provided in the tail section.

The grit settles to the bottom of the trough where the return run of the flights advances the grit into the grit collecting pit. A tail pulley of the jackladder is mounted adjacent the opening to the grit collection pit and the flight guide tunnel to both advance the flights along the bottom of the trough and direct the flights into the tunnel. In this manner, the jackladder flights serve the dual function of advancing bark and logs as well as conveying grit without requiring additional moving parts. Further, the tunnel formed by the cooperating tail section and bridge surrounds each flight and is tapered to prevent debris and small logs from jamming the flights and getting into the collecting trough.

The small bark, remaining grit and water flow to a secondary grit settling trough where the grit settles. The bark and water flow into a bark basin provided with a bark collecting area and showers that direct the bark into the area. The bark is removed from the surface of the water by a bark outlet pipe secured to a floating collar.

The system of the present invention requires no conveying equipment in addition to the jackladder, flume, flume pumps, and booster pump. Further, the additional components having moving parts are limited to the following relatively reliable items: two grit pumps and motors, and one bark pump and motor.

Accordingly, an object of the present invention is to provide a new and improved system for recycling flume water.

Another object of the present invention resides in a system for recycling flume water wherein a minimum number of components having moving parts are used in the system.

A further object of this invention resides in the provision of a bridge between a discharge end of a flume and a tail section of a jackladder for forming a flight guide tunnel to reduce jamming of jackladder flights and to keep logs and sticks out of the grit collecting trough.

Still another object of the present invention is to provide a tail section of a jackladder with tapered apertures to permit water, grit and small pieces of bark to flow from a flume into a grit settling trough located beneath the jackladder.

Yet another object of the present invention resides in the provision of a grit collecting trough beneath a jackladder and the location of a tail pulley at one end of the trough so that the return run of a series of jackladder flights extends along the bottom of the trough to push settled grit into a grit collection pit.

An additional object of the present invention is to provide a floating collar in a bark basin for holding an intake end of a bark outlet pipe at the surface of water in a bark basin.

BRIEF DESCRIPTION OF THE DRAWINGS

These and other objects of the present invention may be appreciated upon reference to the following description of the preferred embodiment when taken in conjunction with the accompanying drawings, in which.

DESCRIPTION OF THE PREFERRED EMBODIMENT

Figures 1, 2:
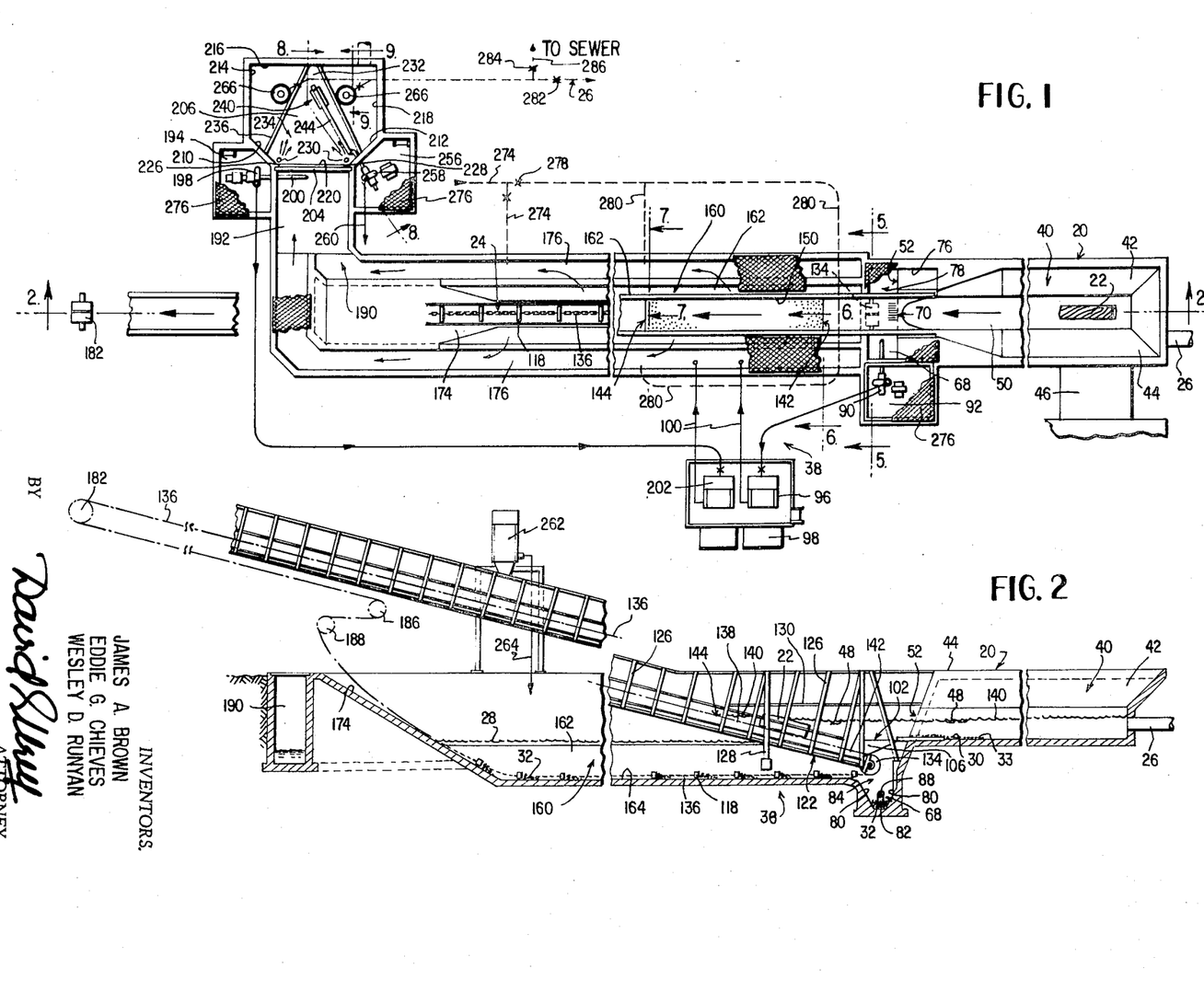
FIG. 1 is a plan view of the system for recycling flume water according to the principles of the present invention.
FIG. 2 is a cross-sectional, elevational view taken along line 2—2 in FIG. 1 showing the flume delivering logs and water to a jackladder.

Referring now in general to FIGS. 1 and 2 of the drawings, there is shown a flume 20 for supplying logs 22 to a jackladder 24 which conveys the logs 22 to a barking drum (not shown) of a paper mill woodyard. A water supply pipe 26 feeds recycled and make-up water 28 to the flume so that the logs 22 float as they are conveyed. The water 28 also serves to clean the logs 22 by removing sand 30, grit 32, rocks 33, and loose pieces of large bark 34 and small bark 36, for example. A water recycling system 38 operating in conjunction with the jackladder 24 separates the sand 30, grit 32, rocks 33, and bark 34 and 36 from the water 28 so that the water may be recycled to the flume 20.

In greater detail, a water and log input end 40 of the flume 20 may be of generally standard design in which a generally U-shaped, lined concrete structure 42 is supplied with water 28 from the pipe 26 at the rate of 30,000 gpm, for example. The upper surface 44 of the structure 42 is flared outwardly to receive the logs 22 that are dumped directly into the flume. Also, some logs 22 may be dumped from railroad cars or trucks onto a slasher deck 46. The logs 22 then roll across the slasher deck 46 and into the flume 20. In addition to the logs 22, appreciable quantities of the sand 30, grit 32, rocks 33, and the bark 34 and 36, along with debris 48, such as sticks and vinery leaves, fall into the water from the logs 22. The denser ones of such materials, such as the sand 30 and rocks 33, settle to a bottom 50 of the flume and are pushed by the water and the logs 22 to a log discharge end 52 of the flume 20. The less dense materials, including the logs 22, bark 34 & 36, grit 32, and debris 48 float on or are suspended in the water.

Figures 3, 4, 5:
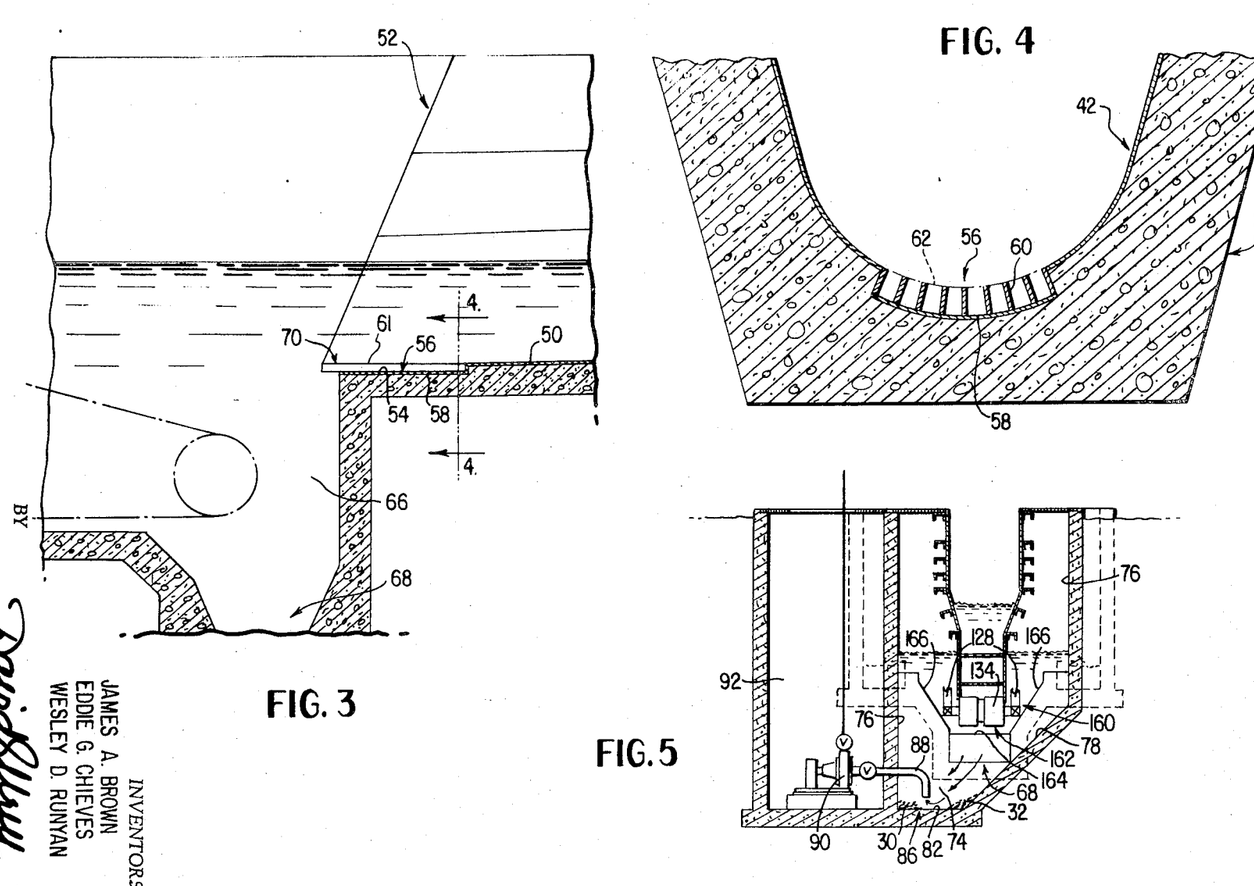
FIG. 3 is a detail view of that portion of FIG. 2 at which a discharge end of the flume meets a bridge extending over a tail section of the jackladder.
FIG. 4 is a cross-sectional view taken along line 4—4 in FIG. 3 showing the discharge end of the flume provided with a sand outlet.
FIG. 5 is a vertical cross-section taken along line 5—5 in FIG. 1 showing a grit collecting pit receiving sand and grit from the sand outlet.

At the discharge end 52, the bottom 50 of the flume 20 is provided with a recess 54 as shown in FIGS. 3 and 4, for reception of a grillwork 56 formed by an arcuate base member 58 and spaced grill bars 60 extending upwardly therefrom. The grill bars 60 terminate along a line 62 conforming to the contour of the bottom 50 such that any logs riding on the bottom 50 are supported. In addition, the grill bars 60 extend horizontally over a portion 66 of a grit collection pit 68 to form a rack and sand outlet 70 while supporting the logs. The spacing between the grill bars 60 permits the sand 30 and the rocks 33 to drop onto the base member 58 where they are pushed by the water 28 over the end 52 of the flume 20 and through the sand outlet 70.

Referring to FIG. 5, the collection pit 68 is shown including a first wet section 74 that extends laterally across the discharge end 52 of the flume 20. The wet section 74 is provided with spaced vertical walls 76—76 and a wall 78 that slopes downstream (downwardly to the left as viewed in FIG. 5). In addition, as shown in FIG. 2, laterally extending walls 80 of the pit 68 diverge from each other as they extend upwardly from a bottom 82 to the pit 68 toward a pit opening 84. The diverging walls 80 and the sloped wall 78 direct the sand and rocks toward a realtively small area 86 on the bottom 82 of the collection pit 68. An intake pipe 88 is mounted above the bottom 82 for delivering the water, sand, rocks, and grit from the bottom 82 to a first grit pump 90 located in a dry pit 92.

At a rate of 600 gpm, for example, the first grit pump 90 supplies the water 28, the sand 30, the grit 32, and the rocks 33 to a first screen 96 (see FIG. 1) where the grit, sand, and rocks fall into a collection container 98 and the clean water 28 is returned to the system 38 via a clean water return pipe 100. The screen 96 may be a static, side-hill screen, for example.

Figure 10:
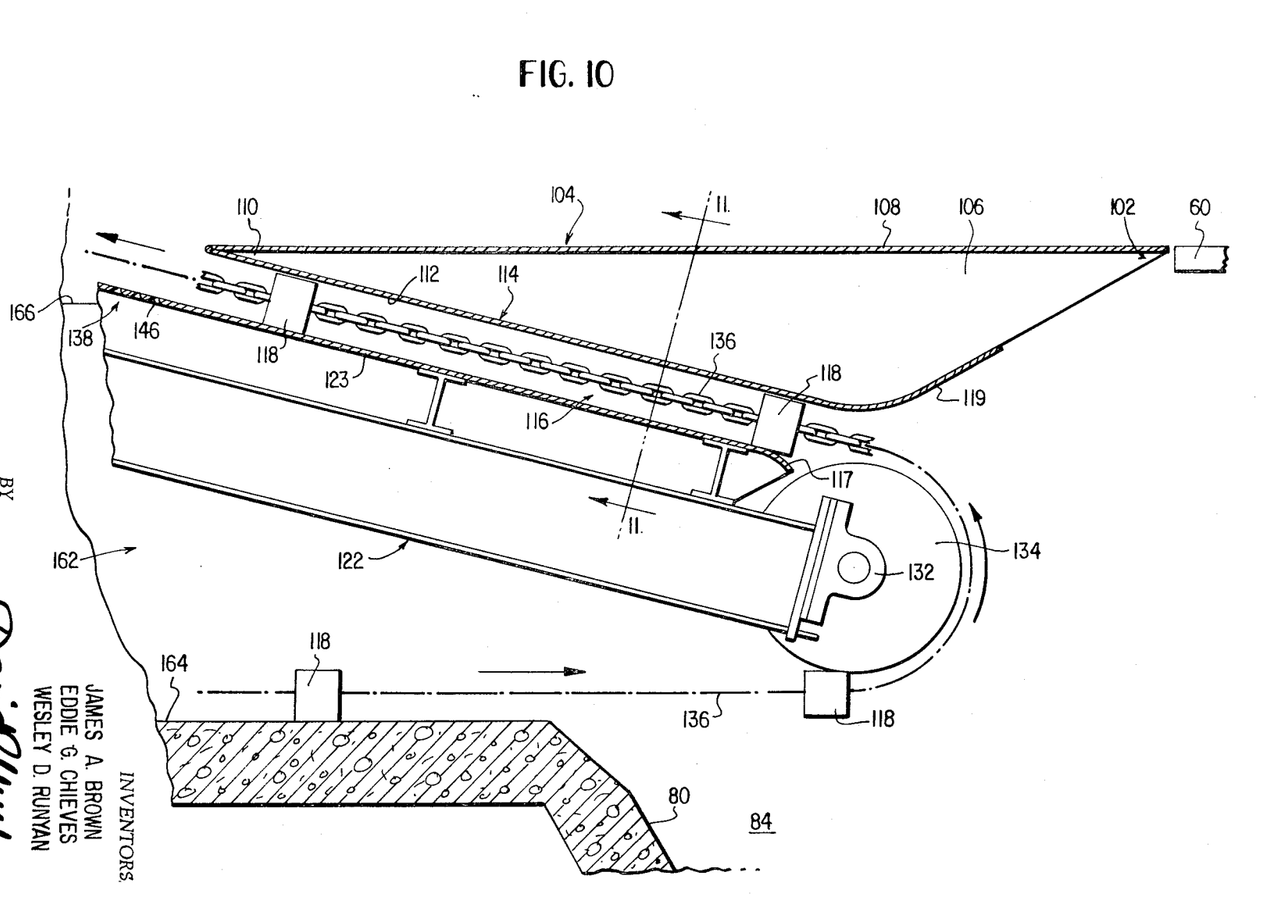
FIG. 10 is an enlarged view of the bridge shown in FIG. 2.
Figure 11:
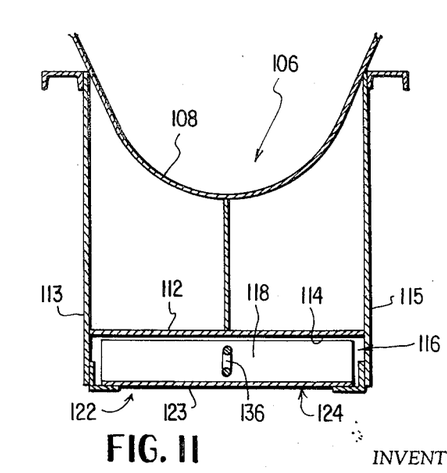
FIG. 11 is a vertical cross-section taken on line 11—11 of FIG. 10 showing a flight guide tunnel for reducing jamming of the flights.

Referring to FIG. 10, the logs 22, grit 32, bark 34 & 36, and debris 48 floating on and suspended in the flume water 28 flow past the sand outlet 70 and onto an inlet end 102 of a first support plate 104. The inlet end 102 is in the form of a bridge 106 that spans the collection pit opening 84 and prevents the flow of the logs, grit, bark, and debris into the collection pit 68. As shown in FIGS. 1, 2, 10 & 11, a top 108 of the bridge is solid and is in vertical alignment with the bottom 50 of the flume 20 and the tops 61 of the grill bars 60 to form an extension thereof. A downstream end 110 (FIG. 10) of the bridge 106 is provided with an underside 112 that forms a first, upper portion 114 of a flight tunnel 116. As shown in FIG. 11, the upper portion 114 has an inverted, generally U-shaped cross section formed by sides 113 and 115 and the underside 112.

A tail section 122 of the jackladder 24 underlies the first tunnel portion 114 to form a second, lower portion 124 of the flight tunnel 116. The tail section 122 includes a second support plate 123 that is secured to the sides 113 and 115 to form the flight tunnel 116. The upstream end of the support plate 123 is flared at 117 to assist the entry of the flights 118 and drive chain 136 into the tunnel 116. Similarly, the underside 112 curves upwardly at a point 119 to guide the flights 118 and the chain 136 into the tunnel 116.

The sides 113 and 115 are of sufficient length from the underside 112 to the support plate 123 to space the support plate 123 from the first upper portion 114 by a distance that slightly exceeds the cross-sectional width of the jackladder flights 118. Also, the distance between the sides 113 and 115 is slightly longer than the length of each flight 118 so that the tail section 122 and the first tunnel portion 114 form the tunnel 116 with a rectangular cross section that is slightly larger than the flights 118. Further, the length of the tunnel 116 is greater than the spacing between the flights 118 so that there is at least one flight in the tunnel 116 at all times. In this manner, the spacings and tunnel length tend to prevent small logs 22 from leaving the flume 20 as some of the water 28 escapes through the tunnel 116. As a result, the number of small logs 22 that become jammed in the jackladder mechanism is reduced.

As shown in FIG. 2, the bridge 106 and the tail section 122 of the jackladder 24 are supported by a framework 126 that is mounted on laterally extending channel beams 130. Opposite ends of the channel beams 130 are supported on a series of columns 128. At the tail section end of the jackladder 24, a pair of pillow blocks 132 (FIGS. 2, 5, & 10) are secured to the framework 128 for supporting a tail pulley 134. The tail pulley 134 engages the chain 136 that drive the series of flights 118 through the flight tunnel 116 and onto a dewatering section or intermediate portion 138 of the jackladder support plate 123.

Still referring to FIG. 2, it may be apparent that the water level in the flume 20 is at a relatively high or first level 140. The dewatering section 138 extends from an upstream end 142 downstream to a point 144, for example, (see FIG. 1 also) where the first water level 140 and the dewatering section 138 intersect. The dewatering section 138 may extend, for example, for about fifteen feet. The dewatering section 138 may be a modification of the standard, normally solid jackladder flight support plate 123 in that throughout the length and width of the dewatering section 138 there are numerous, closely spaced, tapered holes 146 (FIG. 10) through which the flume water 28, grit, and small pieces of bark 36 may flow to leave the flume. For example, the diameter of the holes 146 may be one-half inch so that the small pieces of bark 36 up to one-half inch in diameter may leave the flume 20 with the grit 32 and the water 28. As shown in FIG. 10, the dewatering holes 146 are tapered in cross section such that the water outlet diameter exceeds the water inlet diameter to promote self cleaning of the holes.

The logs 22 and the larger bark 34 are retained on the dewatering section 138, which is wiped by the moving flights 118 so that the retained logs and the larger pieces of bark 34 are carried up the jackladder 24. In this manner, an estimated 70–80 percent of the total amount of bark in the flume water 28 is removed from the water and advances with the logs 22 along the support plate 123 up the jackladder 24.

Figure 6:
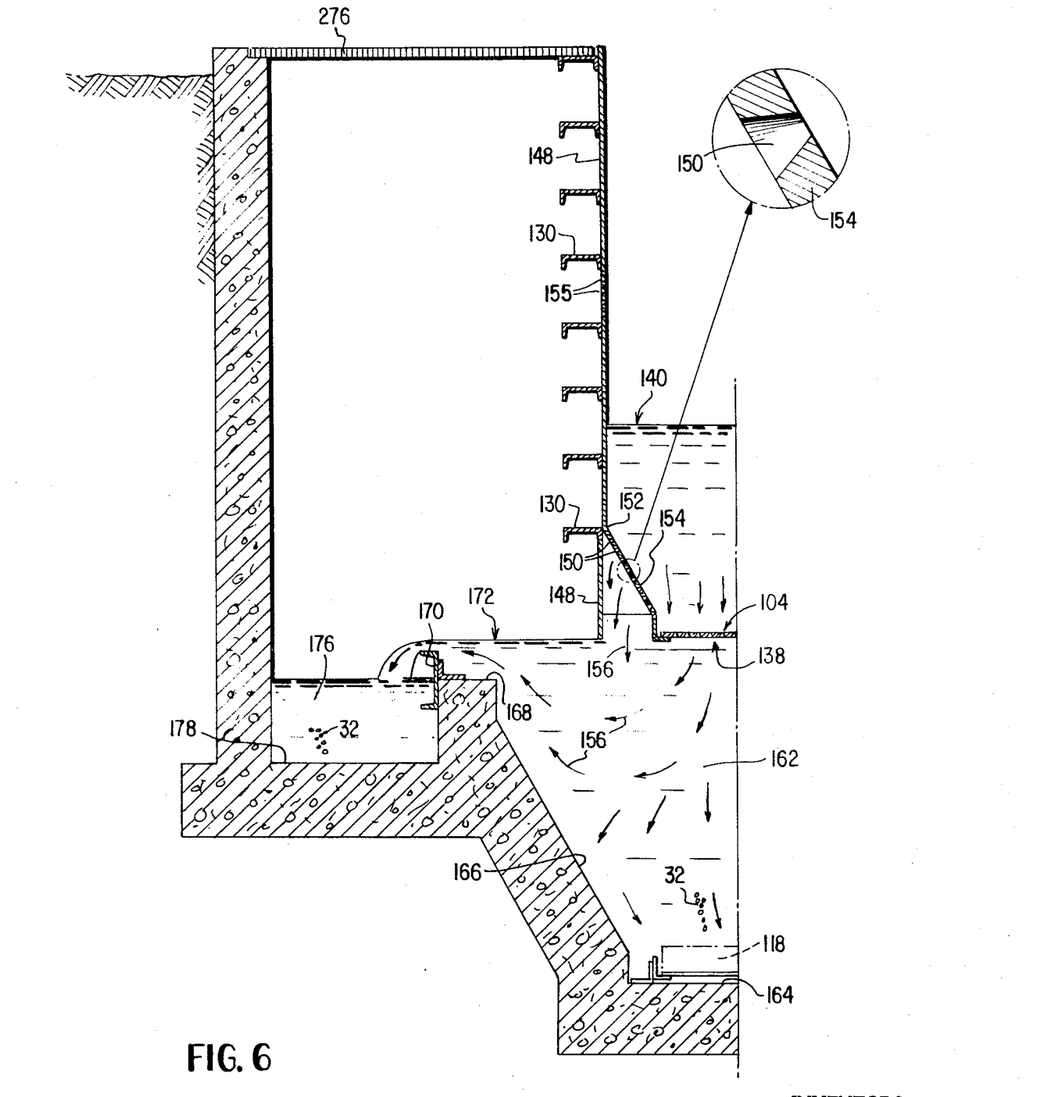
FIG. 6 is a vertical cross-section taken along line 6—6 in FIG. 1 showing a grit settling trough extending beneath the jackladder for receiving water, grit and small pieces of bark.
Figure 7:
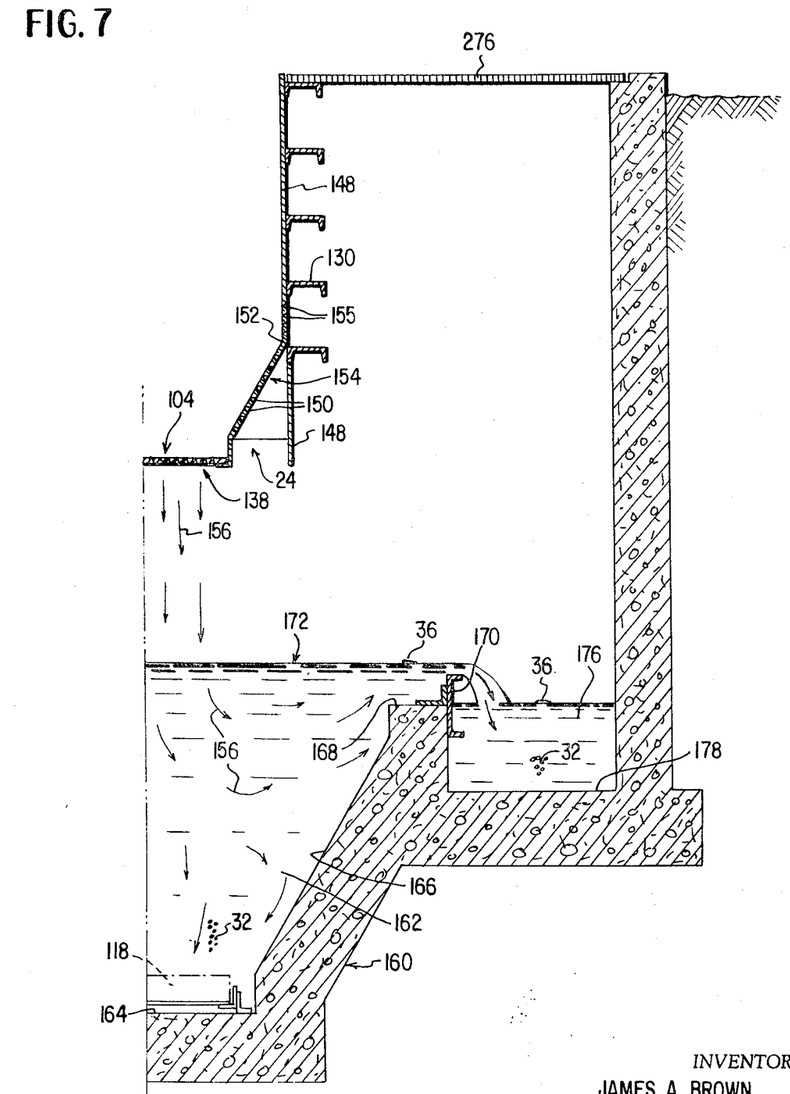
FIG. 7 is a vertical cross-section taken along line 7—7 in FIG. 1 showing a side channel on each side of the trough.

In addition to the holes 146 in the dewatering section 138, opposite side walls 148 (FIGS. 6 & 7) support slanted sections 154 that are provided with similarly sized and tapered holes 150 to permit the water 28, the grit 32, and the small pieces of bark 36 to flow from the flume 20. The side walls 148 form an extension of the flume walls, and, as shown in FIGS. 6 & 7, near the bottom 152 thereof extend alongside the slanted sections 154 so as to direct water, grit, and bark 36 passing through the holes 150 downwardly to establish the water flow path indicated by the arrows 156. An additional row 155 of tapered holes is provided at a higher level in each of the walls 148 so that in the event the slanted sections 154 and the dewatering section 138 are not capable of discharging the entire amount of water supplied to the flume 20, the first water level 140 will rise and water, grit, and small bark will flow through the holes in the row 155.

Referring to FIG. 2, it may be appreciated that the dewatering section 138 of the jackladder 24 is mounted above a grit settling or collecting trough 160. In particular, the dewatering section 138 is in generally vertical alignment with a central portion 162 of the collecting trough 160. As shown in detail in FIG. 2, the central portion 162 is provided with a bottom 164 extending above the level of the bottom 82 of the collection pit and sloping down toward the pit opening 84 at a rate of 3 inches per 100 feet of length, for example. Opposed walls 166 (FIGS. 6 & 7) extend upwardly from the bottom 164 in diverging relationship to form the central portion 162 with a generally V-shaped cross section.

Referring to FIG. 2, it may be appreciated that the tail section 122 of the jackladder 24 extends at an angle downwardly between the diverging walls 166 as the tail section 122 forms the flight tunnel 116 with the underside 112 of the bridge 106. In this manner, the flow of water 28, sand 30, and rocks 33 through the sand outlet 70 is directed in a downward direction around the tail pulley 134 so that the sand and rocks tend to settle to the bottom 82 of the grit collection pit 68. As shown in FIGS. 6 & 7, each of the diverging walls 166 has a top surface 168 provided with an adjustable weir 170 so that the level of the water in the central portion 162 may be varied. In general, however, it may be appreciated that the water level in the central portion 162 is at a second level 172, lower than the first level 140 in the flume 20.

The central portion 162 may extend under the jackladder 24 for a distance of about 103 feet, for example, and terminate in a sloped section 174 (see FIG. 2). The velocity of the water 28 in the central portion 162 decreases as the water flows downstream toward the sloped section 174 and laterally outward toward the weirs 170 on each side such that the fine grit 32 settles out of the water and is directed to the bottom 164 by the walls 166. The small pieces of bark 36 float on the surface of the water at the second water level 172.

The floating bark 36 and the now relatively clear water 28 flow over the weirs 170 into a side channel 176 provided on each side of the central portion 162. The bottom 178 of each of the side channels 176 may slope 6 inches per 100 feet of length, for example, to promote the flow of the water 28 and bark 36 without permitting any substantial amount of grit 32 remaining in the water to settle to the bottom 178.

As shown in FIG. 2, the chain 136 and the flights 118 pass arond a head sprocket 182 at the head end 184 of the jackladder 24. In the return run of the chain 136, the chain 136 then extends under the jackladder 24, around a drive sprocket 186 and idler sprocket 188 and then onto the sloped section 174 of the central portion 162 so that the settled grit 32 is dragged upstream along the bottom 164 into the grit collection pit 68. In this manner, the return-run of the chain 136 is utilized in the water recycling system 38 rather than merely serving to return the flights to the tail section 122 of the jackladder 24. When the flights 118 return to the tail section 122, the tail pulley 134 directs the flights 118 into the flight tunnel 116 for advancement onto the support plate 123 of the jackladder 24.

The relatively clean water 28 and small pieces of bark 36 that flow over the weirs 170 into the side channels 176 flow to a downstream end 190 of the side channels. There, the side channels 176 turn and join at a tertiary grit settling chamber 192. The chamber 192 is relatively wide and deep to promote reduction in the velocity of the water and resultant settling of any grit 32 that remains in the water. A dry well 194 to the left (as viewed in FIG. 1) of the chamber 192 houses a second grit pump 198 that is supplied by a pipe 200 extending to the bottom of the chamber 192. The second grit pump 198 delivers water 28 and grit 32 to a second section 202 of the screen 96. The screen 96 directs the grit 32 into the container box 98 and the clean water 28 is returned via a pipe 100 into the side channel 176.

Figure 8:
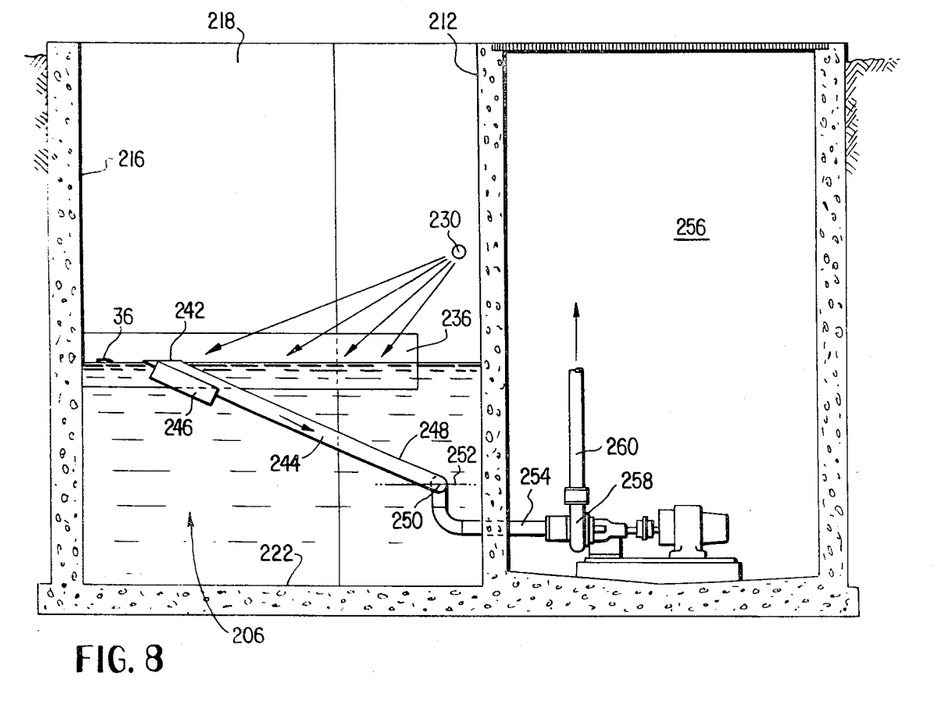
FIG. 8 is a vertical cross-section taken along line 8—8 in FIG. 1 showing a dry pit housing a bark pump for drawing bark and water through a bark skimmer pipe having an inlet end floating on the surface of the water in a bark basin.

At the end of the chamber 192, a timber weir 204 is provided for the clean water 28 and the small pieces of bark 36 to flow over into a bark basin 206. The bark 36 floats on the surface of the water where it is collected and pumped to a static screen 262. In particular, referring to FIGS. 1 & 8, the bark basin 206 includes vertical side walls 210 and 212 that diverge from each other as they extend away from the timber weir 204. Vertical walls 214, 216, 218, and 220 and a bottom 222 complete the basin 206. At the opposite ends 226 and 228 of the timber weir 204, water showers 230 are mounted for creating a flow of surface water and bark toward an apex 232 of a triangular bark collection area 234 formed by the timber weir 204 and a pair of timbers 236 that run from the respective walls 210 and 212 to the wall 216. The timbers 236 may extend 12 inches above and 12 inches below the water surface, for example, so that the bark 36 will be retained in the area 234.

A bark outlet 240 is formed by an open end 242 of a bark skimmer pipe 244 that is supported by a floating collar 246 so that the open end 242 is just below the surface of the water and is generally in the area of the apex 232 of the triangular area 234. The other end 248 of the pipe 244 is connected to a swivel joint 250 that permits the pipe 244 to move clockwise and counter clockwise around a horizontal axis 252 (FIG. 8) of the swivel joint if the water level in the bark basin 206 rises and falls. An inlet pipe 254 is connected to the swivel joint 250 and extends through the wall 212 into a dry pit 256 that houses a bark skimmer pump 258. The pump 258 may be of the open impeller type, for example, and draws the bark 36 that has passed through the tapered holes 146 & 150 and 600 gpm, for example, of water 28 through the bark outlet 240. The pump 258 delivers the bark 36 and the water 28 through a pipe 260 to a screen 262 (FIG. 2) which may be of the static, side-hill type. The screen 262 is mounted above the jackladder 24 and functions to separate the bark 36 from the water 28. The clean water 28 is returned to the side channel 176 via a pipe 264 whereas the bark 36 falls onto the jackladder 24 and is carried away with the logs 22 and the larger bark 34.

Figure 9:
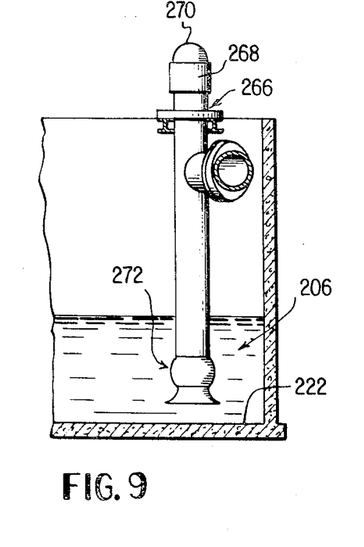
FIG. 9 is a vertical cross-section taken along line 9—9 in FIG. 1 showing a unit for pumping clean water from the bark basin to the flume.

Referring now to FIGS. 1 & 9, there are shown two flume pump units 266 for returning the clean water 28 to the supply pipe 26 of the flume 20. A motor 268 is provided at the top 260 of each unit 266 for driving an impeller (not shown) that is received in an intake housing 272 immersed in the water 28 and extending near the bottom 222 of the bark basin 206. Each unit 266 may have a 15,000 gpm capacity so that the desired 30,000 gpm flow rate will be achieved in the flume.

As shown in FIG. 1, a valve 282 may be provided in the pipe 26 for stopping the flow of water 28 to the flume 20. Also, a second valve 284 and a discharge pipe 286 may be connected to the pipe 26 as shown. With the valve 282 closed and the valve 284 open, water will be delivered to the pipe 286. This is useful for bleeding-off some water from the system 38 in the event the water levels 140 and 172 rise too much, or, for example, for draining the water from the system 38 prior to performing maintenance work.

It may be appreciated that the water recycling system 38 of the present invention enables the woodyard operator to reuse most of the water 28 that initially flows down the flume 20. However, because a certain amount of splashing, evaporation, absorption by the logs 22, etc. will occur and results in the loss of some of the flume water, a water supply pipe 274 from an outside water source (not shown) may be used to supply up to 700 gpm, for example, of make-up water to the side channel 176. Also, a normally closed valve 278 connects the water supply pipe 274 to numerous washdown pipes 280 that may be used to clean out the side channels 176, the grit collection pit 68, or the collecting trough 160.

As shown in FIGS. 1, 6 & 7, a grating 276 is provided over the side channels 176, the dry pits 92, 194 & 256 and over the grit collection pit 68 to prevent undesired objects from falling therein.

In the operating of the water recycling system 38, recycled water, and make-up water are supplied at a rate of 30,000 gpm, for example, through the water supply pipe 26 to the imput end 40 of the flume 20. Logs 22 (and debris 48) from trucks (not shown) or another supply are unloaded onto the slasher deck 46 or directly into the flume from which the logs and debris advance into the input end 40 of the flume. The water 28 floats the logs 22 and the large bark 34 down the flume, across the bridge 106 into engagement with the flights 118 for advancement up the jackladder 24 to the barking drum (not shown). The dense sand 30 and the rocks 33 settle to the bottom 50 of the flume and are pushed by the logs 22 and the water down the flume and between the grill bars 60 of the sand outlet 70. The sand 30 and rocks 33 drop through the sand outlet 70 and into the grit collection pit 68. The sloping walls 78 & 80 direct the sand and rocks to the bottom 82 of the grit collection pit 68 where they are drawn into the intake pipe 88 and are then discharged onto the screen 96. The rocks 33 and sand 30 roll over the screen 96 into the container 98 whereas the water 28 flows through the screen 96 and is returned in relatively clean conditon to the system 38 via the return pipe 100.

The twigs, small bark 36 (less then 1/2 inch in diameter) and grit 32 that are suspended in the water 28 flow down the flume 30 and through the tapered holes 146 of the dewatering section 138. As each flight 118 passes from the flight tunnel 116, it wipes the upstream side of the dewatering section 138 to clear the tapered holes 146 of any debris 48 that may extend partially through them. The taper of the holes 146, combined with the wiping action of the flights 118, promotes self cleaning of the holes 146.

The small bark 36 and debris 48 that flow through the tapered holes 146 & 150 drop down into the central portion 162 of the collecting trough 160. There is a decrease in the water velocity in the downstream direction because the cross-sectional area of the central portion 162 exceeds that of the flume 20 and because the water 28 flows laterally outward toward the weirs 170 on each side of the central portion 162. Also, as shown in FIGS. 6 & 7, the initial downward motion (see arrows 156) of the water and grit, combined with the lower downstream water velocity, promote the settling of part of the grit 32 before the water and grit have flowed downstream past the dewatering section 138. As the water 28 and the rest of the grit 32 flow further downstream, and laterally over the weirs 170 on each side, a major part of the grit 32 settles to the bottom 164 of the trough 160. The chain 136 and the flights 118 move along the return run with the flights 118 scraping the sloping wall 174 and the bottom 164 of the trough 160. In this manner, the settled grit 32 is pushed upstream into the grit collection pit 68 where the first grit pump 90 delivers the grit 32 and water 28 to the screen 96.

The remaining suspended grit 32, the now relatively clean water 28, and the small pieces of bark 36 flow over the weirs 170 into the side channels 176. The water 28, bark 36, and grit 32 meet at the tertiary grit settling chamber 192 where the water velocity again decreases to promote settlement of the remaining grit 32. The second grit pump 198 delivers the grit 32 that settles in the chamber 192 to the second section 202 of the screen 96 for separation from the water.

The clean water 28 and small pieces of bark 36 flow over the timber weir 204 into the bark basin 206. The showers 230 create a flow of surface water and bark toward the juncture of the wide timbers 236 which is at the apex 232 of the bark collection triangle 234. The collar 246 maintains the bark outlet 249 just under the water surface near the apex 232 so that as the bark skimmer pump 258 operates, the bark 36 and some water 28 will be drawn into the bark outlet 240 and separated from the water remaining in the bark basin 206. The bark 36 and the water are pumped to the second screen 262 where the bark 36 advances over the screen and falls onto the logs 22 and the bark 34 that are advanced by the jackladder 24. The clean water 28 separated from the bark 36 flows downwardly into the side channel 176.

The flume pump units 266 are effective to pump the clean water 28 from the bark basin 206 to the water supply pipe 26 at the input end 40 of the flume 20. In this manner, less than 3 percent of the original water flowing down the flume 20 need be supplied to the recycling system 38 from the water make-up pipe 274. Thus, the operation of cleaning and conveying the logs 22 to the barking drum (not shown) does not require excessive amounts of water nor are the grit 32, sand 30, rocks 33, and debris 48 discharged into a separate body of water.

It is to be understood that only a preferred embodiment of the invention has been specifically illustrated and described, and variations may be made thereto without departing from the invention, as defined in the appended claims.

What is claimed is:

1. Apparatus for recycling water used in a system for handling logs, which comprises:
   jackladder means including a series of flights for advancing logs to a transfer station, said means including an upper flight guide for supporting said flights in an inclined, upper path so that said flights engage the logs adjacent a lower, inlet end of said guide, and a lower flight guide for directing said flights toward said inlet end of said upper flight guide;
   settling trough means having a central portion under said jackladder means for receiving said inlet end of said upper flight guide, said central portion having a bottom;
   flume means having an outlet end for discharging grit, sand, water and logs onto said inlet end of said upper flight guide above said central portion of said trough means;
   means mounted beneath the outlet end of said flume means for collecting sand and grit;
   said inlet end of said upper flight guide being provided with tapered apertures to permit water and grit from said flume means to flow downwardly into said central portion of said trough means;
   said central portion of said trough means being elongated and extending under at least a portion of said upper flight path to permit the velocity of said water from said flume to decrease such that the grit settles to the bottom of said central portion;
   bridge means extending from said flume means into spaced, overlying relationship with the inlet end of said upper flight guide for extending the flume means to said inlet end of said jackladder means, said bridge means and said inlet end of said upper flight guide being effective to define a flight guide tunnel for containing each flight as it initially advanced along said upper flight path to prevent obstruction of said flights, said bridge being provided with a sand outlet overlying said collecting means to permit sand from said flume means to fall into said collecting means;
   means for mounting said lower flight guide adjacent said collecting pit and in said central portion of said trough means for guiding said flights such that said lower flight path extends along the bottom of said central portion to enable the flights to drag the settled grit into the collecting means; and
   means receptive to the water from said central portion for recycling said water to said flume means.

2. An apparatus according to claim 1, which comprises:
   said tapered apertures having a smaller inlet diameter than exit diameter to reduce jamming of bark in the apertures;
   screen means for separating grit and sand from the water; and
   means for pumping sand, grit and water from the grit collecting pit to said screen means;
   said screen means being effective to discharge the water into said water recycling means.

3. An apparatus according to claim 1, in which:
   said recycling means includes a bark basin, said bark basin being provided with means for defining a bark collecting area, pipe means having an open bark outlet end for receiving bark, and floatation means surrounding said bark outlet end for maintaining said end just below the surface of the water in the bark basin;
   screen means are mounted above said jackladder means for separating bark from water, said separated bark falling onto the logs and bark on said jackladder means, said screen means being effective to return the separated water to said recycling means; and
   means for drawing bark and water into said bark outlet and delivering said water and bark to said screen means.

4. Apparatus according to claim 1, wherein:
   the distance between said flights is less than the length of said tunnel so that at least one flight is advancing through the tunnel at any moment; and
   said tunnel is provided with an exit end and an inlet end, said inlet end having a selected cross-section conforming to the cross-section of the flights so that any debris in said tunnel is pushed to the exit end thereof, said inlet end of said tunnel being smaller than said exit end to reduce jamming of debris in said tunnel.

5. Apparatus according to claim 1, wherein:

said water discharged by said flume means carries large and small pieces of bark, said tapered apertures being effective to permit said small pieces of bark to flow into said central portion of said trough means; and said recycling means includes a channel on each side of said central portion for receiving water and small bark from said central portion, means receptive to small bark and water from said channels for separating said small bark from said water, and means for pumping said water to said flume means.

6. Apparatus according to claim 5, in which:

said separating means includes a bark basin for containing water and small bark floating on the water, means for defining a bark collecting area, means for pumping surface water and small bark from the bark basin, and spray means for directing streams of water onto the surface of the water in the bark basin and toward said bark collecting area to cause the small bark to flow into the bark collecting area.

7. A system for separating flume water from logs, bark, sand, grit and woodyard debris, which comprises:

jackladder means for advancing logs and bark along an inclined path from a lower receiving station to an upper transfer station, said jackladder having a series of flights movable in an upper path for engaging said logs and bark;

a flume provided with a supply of water for floating the logs and the bark to said receiving station, the water in said flume being at a first level;

a collecting pit at said receiving station for receiving grit and sand;

a settling trough having a bottom above and communicating with said collecting pit, said trough having an inlet end at said receiving station, said trough being provided with a pair of walls diverging upwardly from said bottom to form a generally V-shaped central portion beneath said upper path of said flights, said central portion being flanked by a pair of side channels;

a weir being provided between the central portion and each side channel to maintain the water in said central portion at a second, lower level;

support means including a first section extending from said flume over said collecting pit, said first section having an outlet therein to permit sand from said flume to enter said collecting pit, said support means further including a second section extending from within said central portion of said trough and below said second water level for a given first length beneath said first section for defining a flight guide tunnel having an entrance and an exit, said second section being mounted relative to said first section so that the size of said entance is smaller than that of said exit, said second section further extending out of and over said central portion and beneath said jackladder for supporting said flights in said upper path thereof, an intermediate portion of said second section receiving water flowing across said first section, said intermediate portion being provided with tapered apertures to permit water, grit and small pieces of bark to advance downwardly into said trough;

said trough extending beneath said jackladder and having a larger cross-sectional area than said flume to permit a reduction of the velocity of said water from said flume so that the grit settles to the bottom of said trough and the water and the bark flow over said weirs into said side channels;

said jackladder further including a tail pulley mounted at the inlet end of said settling trough for guiding said series of flights in a second path thereof along the bottom of the collecting trough to advance said settled grit into said collecting pit, said tail pulley also being effective to guide said flights into said flight guide tunnel for advancement along said second section of said support means into engagement with the logs and large pieces of bark; and means for separating the bark from the water in said side channels, said means being effective to deposit said bark on said jackladder for advancement to said transfer station and to recycle said water to said flume.

8. A system according to claim 7, in which:

said separating means includes a bark basin for collecting bark and water from said side channels, timbers mounted at the surface of the water in the bark basin for defining a bark collecting area, at least one shower for spraying water toward said timbers to direct bark into said area, a pipe having an opening in said area for collecting bark from the surface of the water, floatation means mounted adjacent the opening of said pipe for maintaining the opening adjacent the surface of the water to enable the pipe to collect the bark, and a pump for receiving clean water from the bottom of the bark basin and delivering the water to the flume.

9. A system according to claim 7, which further includes:

a static screen for separating grit and sand from water;

first pump means for receiving grit, sand and water from the collecting pit and delivering it to said screen;

a container for receiving grit and sand from said screen; and means for returning the water from said screen to at least one of said side channels.

10. A system for separating logs and bark from flume water, grit and sand, which comprises:

a flume having an end for discharging logs, bark, water, grit and sand;

a trough having an inlet end spaced from said discharge end of said flume, said trough having a central portion provided with a bottom and opposed walls extending upwardly from said bottom in diverging relationship, each of said walls having a top surface;

a collecting pit between said end of said flume and the inlet end of said trough, said pit having an opening at the top thereof;

a bridge spanning said opening of said collecting pit to support water and logs discharged from said end of said flume, said bridge having an outlet therein to permit sand from said flume to enter said pit, said bridge having an underside provided with an inverted U-shape;

a jackladder for conveying logs and bark from said bridge, said jackladder being provided with a support plate including a first end section extending between said diverging walls and beneath the underside of said bridge to form a closed flight guide tunnel, said jackladder having a series of flights, said support plate having an inclined section extending out from between said diverging walls and over at least a part of said central portion, said inclined and first end sections being effective to maintain a first water level in said flume wherein the first water level is above the level of water in the central portion, said inclined section being provided with tapered apertures therein to permit water, grit and small pieces of bark to flow downwardly into said central portion, said apertures being tapered outwardly toward said central portion such that the cross section of the aperture on the first water level side of the plate is smaller than the cross section of the aperture on the other side of the plate to reduce plugging of said apertures; said trough extending away from said inclined section so that the velocity of water in said central portion decreases as it flows away from said apertures to permit the grit to settle to the bottom of the central portion;

said jackladder means including a tail pulley mounted beneath said bridge for guiding said flights along said bottom to convey said settled grit into said pit and for guiding said flights into said flight guide tunnel for movement onto said support plate for engaging logs and bark supported by said bridge; and a weir mounted to each of said diverging walls for controlling the flow of water and bark over said top surfaces to reduce the water velocity in said central section and promote settling of grit in said central section.

11. Apparatus for removing from flume water grit suspended in the water and bark floating on the water, which comprises:

a pair of channels for receiving the grit, bark and water;

a settling pit having a bottom and a cross section exceeding that of said pair of channels for reducing the velocity of water received from said channels so that the grit settles to the bottom;

a bark basin adjacent the settling pit for receiving water and bark from the settling pit;

a pair of members extending along the surface of the water in said bark basin from one side thereof and converging adjacent an opposite side thereof to form a bark collection area;

a pipe received in said bark basin, said pipe having an inlet opening at an inlet end thereof and a discharge opening;

a floatation collar secured to said inlet end of said pipe for maintaining said inlet opening adjacent the water surface in the bark basin;

means for mounting said pipe with said inlet opening in said bark collecting area;

first means connected to said outlet opening for pumping bark and water from said bark collecting area; and second means having an inlet adjacent the bottom of the bark basin for pumping clean water from said bark basin.

12. In an apparatus for recycling water used in a flume, said flume including a water filled channel terminating at a discharge end, the water in said channel being effective to convey logs, grit, sand and bark to a tail section of a jackladder, said jackladder having a series of flights spaced by a selected distance and a tail pulley for guiding the flights, the improvement in said apparatus which comprises:

a grit collecting pit positioned below the discharge end of the flume, said pit having an opening;

a series of spaced bars secured to and extending beyond the discharge end of the flume above the opening to the pit, said bars being effective to support logs while permitting sand to pass therebetween and into the pit;

a collecting trough having one end adjacent the pit, said trough including a central portion extending under the jackladder and having a bottom and spaced walls extending upwardly from the bottom in diverging relationship, said central portion being flanked on each side thereof by a side channel;

means for mounting tail section of the jackladder between the diverging walls of the one end of the central portion and spaced from the discharge end of the flume;

a bridge mounted between the tail section of the jackladder and the discharge end of the flume for directing water, logs and grit from the flume onto a first portion of said tail section, said bridge having a tunnel section extending above the tail section, said tunnel section having an inverted, generally U-shaped cross section, said tail section and said tunnel section cooperating to form a tunnel for guiding said flights, the tunnel having a length that is greater than said selected distance so that at least one flight is in the tunnel for preventing logs from passing through the tunnel;

said tail section having a second portion extending downstream from said first portion, said second portion having a plurality of tapered aperatures therein to permit water, grit and small pieces of bark to flow from the flume side of the jackladder into the central portion of the trough, each of said aperatures having a smaller diameter on the flume side and a larger diameter on the trough side thereof to reduce jamming of debris therein;

the cross section of the central portion being larger than that of the flume and the height of the walls being low enough to permit water to flow into the side channels so that the water velocity in the central portion is less than that in said flume to permit the grit to settle to the bottom of the central portion;

means for mounting the tail pulley in the central portion adjacent the upstream end of the tunnel to permit the tail pulley to guide the flights across the bottom of the central portion and into the tunnel, the movement of the flights across the bottom being effective to push the settled grit into the pit;

a grit settling pit receptive to water, grit and bark from the side channels, said pit being effective to decrease the velocity of the water to promote settling of grit suspended in the water;

a bark basin for receiving water and bark floating on the water from the grit settling pit, said basin having a first wall and a second wall opposite from the first wall, the water and bark flowing over the top of the first wall toward the second wall, a pair of timbers extending from the first wall in converging relationship toward the second wall to form an apex adjacent the second wall, the timbers defining a bark collecting area, said basin being provided with showers for urging the bark and surface water toward the apex of said timbers;

a first pipe having one end thereof floating at the surface of the water in the bark collecting area for receiving water and bark;

a second pipe having one end thereof at the bottom of the bark basin for receiving clear water; and means for pumping the clean water to the flume.

* * * * *